United States Patent
Hasegawa

(10) Patent No.: US 11,108,310 B2
(45) Date of Patent: Aug. 31, 2021

(54) FIELD CORE STRUCTURE FOR ROTARY ELECTRIC MACHINE ROTOR

(71) Applicant: Mitsubishi Electric Corporation, Tokyo (JP)

(72) Inventor: Kazuya Hasegawa, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 77 days.

(21) Appl. No.: 16/342,056

(22) PCT Filed: Nov. 11, 2016

(86) PCT No.: PCT/JP2016/083537
§ 371 (c)(1),
(2) Date: Apr. 15, 2019

(87) PCT Pub. No.: WO2018/087889
PCT Pub. Date: May 17, 2018

(65) Prior Publication Data
US 2019/0260244 A1    Aug. 22, 2019

(51) Int. Cl.
*H02K 1/22* (2006.01)
*H02K 21/04* (2006.01)
(Continued)

(52) U.S. Cl.
CPC .............. *H02K 21/044* (2013.01); *H02K 1/24* (2013.01); *H02K 1/243* (2013.01); *H02K 3/24* (2013.01);
(Continued)

(58) Field of Classification Search
CPC .......... H02K 1/226; H02K 1/24; H02K 1/243; H02K 3/24; H02K 3/325; H02K 3/525;
(Continued)

(56) References Cited

U.S. PATENT DOCUMENTS

| 5,903,073 A | 5/1999 | Mukai |
| 2004/0021388 A1* | 2/2004 | Wada ....................... H02K 1/16 310/180 |

(Continued)

FOREIGN PATENT DOCUMENTS

| CN | 102420486 A * | 4/2012 |
| CN | 102420486 A | 4/2012 |

(Continued)

OTHER PUBLICATIONS

Machine translation of CN-102420486-A. (Year: 2012).*
(Continued)

*Primary Examiner* — Michael Andrews
(74) *Attorney, Agent, or Firm* — Sughrue Mion, PLLC; Richard C. Turner

(57) ABSTRACT

This rotary electric machine rotor includes: a Lundell core that includes a cylindrical portion, a pair of yoke portions, and a plurality of claw-shaped magnetic pole portions; a bobbin that is mounted around an outer circumference of the cylindrical portion; a field coil that is wound onto the bobbin in multiple layers, the field coil contacting a vicinity of roots of inner circumferential surfaces of the claw-shaped magnetic pole portions; and a cooling fan that supplies air to an outer circumferential surface of the field coil, wherein the field coil is formed so as to have a peaked shape in which two or more peaks line up consecutively in an axial direction, an apex portion of each of the peaks being positioned radially further outward than a root position of the claw-shaped magnetic pole portions.

3 Claims, 3 Drawing Sheets

(51) Int. Cl.
*H02K 3/32* (2006.01)
*H02K 9/06* (2006.01)
*H02K 1/24* (2006.01)
*H02K 3/24* (2006.01)

(52) U.S. Cl.
CPC .............. *H02K 3/325* (2013.01); *H02K 9/06* (2013.01); *H02K 2203/12* (2013.01)

(58) Field of Classification Search
CPC ...... H02K 3/528; H02K 9/06; H02K 2203/12; H02K 15/08; H02K 15/085; H02K 15/09; H02K 15/095
USPC ...................................... 310/62, 156.66, 263
See application file for complete search history.

(56) References Cited

U.S. PATENT DOCUMENTS

2005/0218744 A1* 10/2005 Nakanishi ............. H01F 41/098
　　　　　　　　　　　　　　　　　310/194
2013/0187515 A1* 7/2013 Ishikawa ................ H02K 1/243
　　　　　　　　　　　　　　　　　310/263

FOREIGN PATENT DOCUMENTS

| EP | 1 381 141 A2 | 1/2004 |
|---|---|---|
| JP | 56-174936 U1 | 12/1981 |
| JP | 10-056759 A | 2/1998 |
| JP | 2000-341890 A | 12/2000 |

OTHER PUBLICATIONS

Extended European Search Report dated Sep. 19, 2019 issued by the European Patent Office in counterpart application No. 16921185.1.
International Search Report for PCT/JP2016/083537 dated Jan. 31, 2017 [PCT/ISA/210].

* cited by examiner

FIELD CORE STRUCTURE FOR ROTARY ELECTRIC MACHINE ROTOR

CROSS REFERENCE TO RELATED APPLICATIONS

This application is a National Stage of International Application No. PCT/JP2016/083,537, filed on Nov. 11, 2016.

TECHNICAL FIELD

The present invention relates to a Lundell rotor that is used in a rotary electric machine such as an alternator or an electric motor that is mounted to a vehicle, for example.

BACKGROUND ART

In automotive alternators of this kind, as the need for increased output has increased in recent years, demand for noise reduction due to end user desire for higher quality is also becoming more intense. When electric current flows through the field coil, the temperature of the field coil rises and electrical resistance increases due to Joule heat. Magnetomotive forces in the rotor decrease due to the increase in the electrical resistance in the field coil, reducing output.

In consideration of such conditions, magnetomotive forces in rotors have been ensured by making an outermost diameter of a field coil greater than an outside diameter of a root position of claw-shaped magnetic pole portions to increase surface area of the field coil, and using a cooling fan to cool the field coil actively, to suppress increases in electrical resistance that result from temperature rises in the field coil (see Patent Literature 1, for example).

It is generally known that by making the outside diameter of a field coil greater than the outside diameter of the root positions of the claw-shaped magnetic pole portions to press the field coil against the inner circumferential surfaces in a vicinity of the roots of the claw-shaped magnetic pole portions amplitude of oscillation of the claw-shaped magnetic pole portions is reduced, reducing resonant noise from the claw-shaped magnetic pole portions.

CITATION LIST

Patent Literature

Patent Literature 1: Japanese Patent Laid-Open No. 2000-341,890 (Gazette)

SUMMARY OF THE INVENTION

Problem to be Solved by the Invention

In conventional automotive alternators, the field coil has been produced into a single-peaked peak shape in which the outside diameter thereof increases gradually toward an axially central portion from a first axial end, and becomes gradually smaller toward a second end from the axially central portion. Thus, one problem has been that if the surface area is increased by increasing the outermost diameter of the field coil in order to ensure cooling of the field coil, the amount of conductor wire increases more than necessary, increasing costs. In addition, another problem has been that the average value of the outside diameter of the claw-shaped magnetic pole portions is increased, increasing centrifugal forces that act on the field coil.

The present invention aims to solve the above problems and an object of the present invention is to provide a rotary electric machine rotor that suppresses increases in amounts of conductor wire while ensuring cooling, to enable reductions in cost, and that can also suppress increases in centrifugal forces that act on a field coil.

Means for Solving the Problem

A rotary electric machine rotor according to the present invention includes: a Lundell core that includes: a cylindrical portion; a pair of ring-shaped yoke portions that are disposed on two axial end portions of the cylindrical portion; and a plurality of claw-shaped magnetic pole portions that are disposed so as to extend axially alternately from each of the pair of yoke portions, the claw-shaped magnetic pole portions being arranged circumferentially so as to intermesh with each other; a rotating shaft that is inserted into and fixed to a central axial position of the Lundell core; a bobbin that includes: an annular drum portion that is mounted around an outer circumference of the cylindrical portion; and a pair of flat ring-shaped flange portions that protrude radially outward from two axial end portions of the drum portion; a field coil that is wound in multiple layers in a space that is surrounded by the drum portion and the pair of flange portions, the field coil contacting a vicinity of roots of inner circumferential surfaces of the claw-shaped magnetic pole portions; and a cooling fan that supplies air to an outer circumferential surface of the field coil, wherein the field coil is formed so as to have a peaked shape in which two or more peaks line up consecutively in an axial direction, an apex portion of each of the peaks being positioned radially further outward than a root position of the claw-shaped magnetic pole portions.

Effects of the Invention

According to the present invention, the field coil is formed so as to have a peaked shape in which two or more peaks line up consecutively in an axial direction, an apex portion of each of the peaks being positioned radially further outward than a root position of the claw-shaped magnetic pole portions. Thus, because surface area of the field coil that is exposed to air that is supplied by the cooling fan can be ensured to be equal to that of a field coil that has a peaked shape that has a single peak, cooling of the field coil can be ensured. Because a valley is formed, the amount of conductor wire that constitutes the field coil can be reduced, enabling reductions in cost to be achieved.

Because the field coil is formed so as to have a peaked shape in which two or more peaks line up consecutively in the axial direction, a mean outside diameter of the field coil is reduced compared to single-peaked field coils, reducing centrifugal forces that act on the field coil.

DESCRIPTION OF EMBODIMENTS

Embodiment 1

Figure 1:
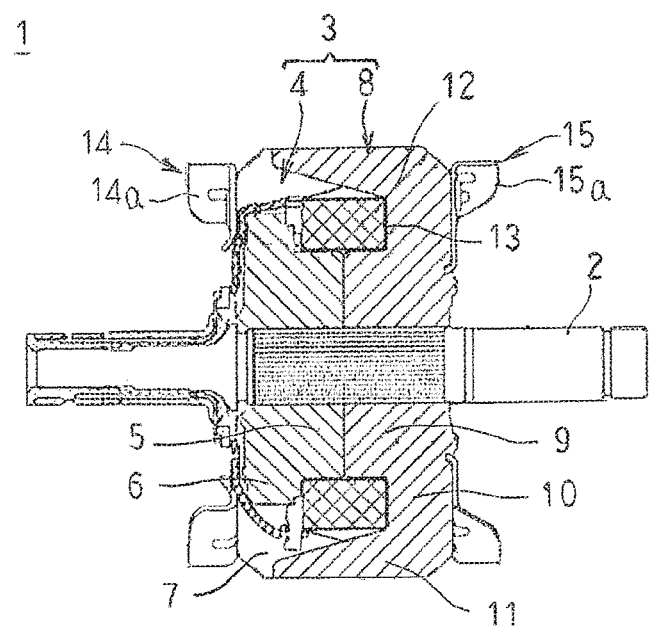
FIG. 1 is a cross section that shows a rotary electric machine rotor according to Embodiment 1 of the present invention.
Figure 2:
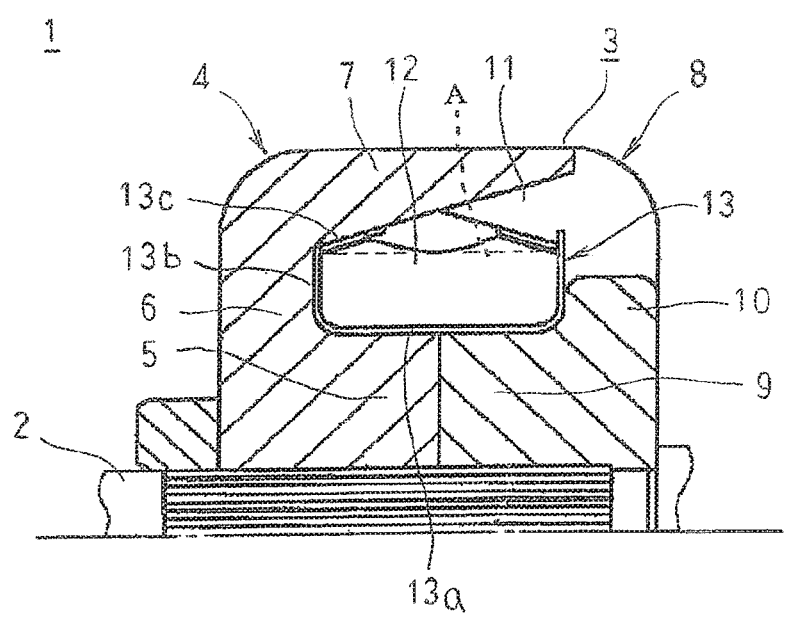
FIG. 2 is a cross section that shows part of the rotary electric machine rotor according to Embodiment 1 of the present invention.

FIG. 1 is a cross section that shows a rotary electric machine rotor according to Embodiment 1 of the present invention, and FIG. 2 is a cross section that shows part of the rotary electric machine rotor according to Embodiment 1 of the present invention. Moreover, in FIG. 2, a broken line A represents an outside diameter of root positions of a first claw-shaped magnetic pole portion and a second claw-shaped magnetic pole portion.

In FIGS. 1 and 2, a rotor 1 includes: a rotating shaft 2; a Lundell core 3 that is fixed to the rotating shaft 2; a field coil 12; and centrifugal fans 14 and 15 that function as cooling fans.

The Lundell core 3 is configured so as to be divided into a first pole core 4 and a second pole core 8. The first pole core 4 includes: a first cylindrical portion 5; a thick ring-shaped first yoke portion 6 that has a larger diameter than that of the first cylindrical portion 5, that is formed integrally on a first axial end portion of the first cylindrical portion 5; and a plurality of first claw-shaped magnetic pole portions 7 that are each disposed so as to extend toward a second axial end from the first yoke portion 6 and that are arranged at a uniform pitch in a circumferential direction. The first claw-shaped magnetic pole portions 7 are formed so as to have a tapered shape in which a radially outermost surface shape thereof is an approximately trapezoidal shape, a circumferential width gradually becomes narrower toward a vicinity of a tip, and a radial thickness gradually becomes thinner toward the vicinity of the tip.

The second pole core 8 includes: a second cylindrical portion 9; a thick ring-shaped second yoke portion 10 that has a larger diameter than that of the second cylindrical portion 9, that is formed integrally on a second axial end portion of the second cylindrical portion 9; and a plurality of second claw-shaped magnetic pole portions 11 that are each disposed so as to extend toward a first axial end from the second yoke portion 10 and that are arranged at a uniform pitch in a circumferential direction. The second claw-shaped magnetic pole portions 11 are formed so as to have a tapered shape in which a radially outermost surface shape thereof is an approximately trapezoidal shape, a circumferential width gradually becomes narrower toward a vicinity of a tip, and a radial thickness gradually becomes thinner toward the vicinity of the tip.

The first pole core 4 and the second pole core 8 that are configured in this manner are configured into a single body by press-fitting a rotating shaft 2 into a central axial position thereof in a state in which a second axial end surface of the first cylindrical portion 5 and a first axial end surface of the second cylindrical portion 9 are butted together. Here, the first claw-shaped magnetic pole portions 7 and the second claw-shaped magnetic pole portions 11 are disposed so as to extend axially alternately from the first yoke portion 6 and the second yoke portion 10, respectively, and are arranged circumferentially so as to intermesh with each other.

A bobbin 13 is a resin-molded body that is made of an electrically insulating resin, and includes: a thin cylindrical drum portion 13a; a pair of thin flat ring-shaped flange portions 13b that protrude radially outward from two axial end portions of the drum portion 13a; and tongue portions 13c that extend outward from each of the pair of flange portions 13b.

The field coil 12 is configured by winding a conductor wire so as to be stacked in multiple layers on the bobbin 13. Here, the field coil 12 is configured so as to have a peaked shape in which an outside diameter gradually increases then gradually decreases from a first axial end toward a central portion, and then gradually increases then gradually decreases from the central portion toward a second axial end, and reaches the second axial end. In other words, the field coil 12 is configured so as to have a peaked shape in which two peaks line up consecutively in an axial direction.

The field coil 12 is wound onto the bobbin 13, and is housed in a space that is surrounded by the first cylindrical portion 5, the second cylindrical portion 9, the first yoke portion 6, the second yoke portion 10, the first claw-shaped magnetic pole portions 7, and the second claw-shaped magnetic pole portions 11. The drum portion 13a is mounted in a state of external contact with the first cylindrical portion 5 and the second cylindrical portion 9, which are linked in an axial direction. The pair of flange portions 13b contact inner surfaces of the first yoke portion 6 and the second yoke portion 10 that face each other in the axial direction. Outside diameters of the field coil 12 at the first end, the central portion, and the second ends in the axial direction are equal to an outside diameter A of the root positions of the first claw-shaped magnetic pole portions 7 and the second claw-shaped magnetic pole portions 11. An inclined surface of a first peak of the field coil 12 contacts a vicinity of roots of inner circumferential surfaces of the first claw-shaped magnetic pole portions 7 so as to have the tongue portions 13c interposed. An inclined surface of a second peak of the field coil 12 contacts a vicinity of roots of inner circumferential surfaces of the second claw-shaped magnetic pole portions 11 so as to have the tongue portions 13c interposed. Moreover, the root positions of the first claw-shaped magnetic pole portions 7 and the second claw-shaped magnetic pole portions 11 are boundary positions with the first yoke portion 6 in a vicinity of the roots of the first claw-shaped magnetic pole portions 7, and boundary positions with the second yoke portion 10 in a vicinity of the roots of the second claw-shaped magnetic pole portions 11.

The centrifugal fans 14 and 15 include blades 14a and 15a that extend axially, and are fixed to two axial end surfaces of the Lundell core 3 by welding, etc. In this case, the number of blades 14a and 15a is equal, and surface area of the blades 14a is greater than surface area of the blades 15a, making blowing capacity of the centrifugal fan 14 greater than blowing capacity of the centrifugal fan 15.

The rotor 1 that is configured in this manner is used in an automotive alternator, for example. In other words, although not shown, the rotor 1 is rotatably disposed inside a housing that is constituted by a brachial bowl shaped first bracket and second bracket such that the rotating shaft 2 is supported by the first bracket and the second bracket. A stator (not shown) is clamped between the first bracket and the second bracket from two axial directions, and is disposed outside the rotor 1 so as to be coaxial to the rotor 1 so as to have a predetermined clearance interposed. In addition, a rectifier (not shown) that rectifies alternating current that is generated in the stator into direct current, and a voltage regulator (not shown) that adjusts magnitude of the alternating-current voltages that are generated in the stator, etc., are disposed on the housing, to constitute the automotive alternator.

In the automotive alternator, an electric current is supplied to the field coil 12 from a battery to generate magnetic flux. The first claw-shaped magnetic pole portions 7 are magnetized into North-seeking (N) poles by this magnetic flux, and the second claw-shaped magnetic pole portions 11 are magnetized into South-seeking (S) poles.

At the same time, rotational torque from an engine is transmitted to the shaft 2 to rotate the rotor 1. Thus, a rotating magnetic field is applied to a stator coil of the stator, generating electromotive forces in the stator coil. These alternating-current electromotive forces are rectified into direct current by the rectifier to charge the battery or to be supplied to electric loads, etc.

The electric current flows through the field coil 12, and the field coil 12 generates heat. The centrifugal fans 14 and 15 are also rotated together with the rotation of the rotor 1. Air is thereby sucked in through air intake apertures of the first bracket, flows to a vicinity of the first pole core 4 of the rotor 1, is deflected centrifugally by the centrifugal fan 14, cools coil ends of the stator coil, and is discharged through air discharge apertures of the first bracket. Similarly, air is sucked in through air intake apertures of the second bracket, flows to a vicinity of the second pole core 8 of the rotor 1, is deflected centrifugally by the centrifugal fan 15, cools coil ends of the stator coil, and is discharged through air discharge apertures of the second bracket.

Here, because the blowing capacity of the centrifugal fan 14 is greater than the blowing capacity of the centrifugal fan 15, pressure in a vicinity of the first bracket of the rotor 1 is lower than pressure in a vicinity of the second bracket. Due to this pressure difference, air in the vicinity of the second bracket flows into the rotor 1 from between the second claw-shaped magnetic pole portions 11, passes between the first claw-shaped magnetic pole portions 7, and flows out in a vicinity of the first bracket. Heat generated in the field coil 12 is radiated to the air that flows through this pathway, suppressing temperature increases in the field coil 12.

Here, making the blowing capacity of the centrifugal fans 14 and 15 mutually different from each other means generating a pressure difference between the vicinity of the first bracket and the vicinity of the second bracket of the Lundell core 3 when the rotor 1 is driven to rotate.

In Embodiment 1, because the blowing capacity of the centrifugal fan 14 is greater than the blowing capacity of the centrifugal fan 15, a pressure difference arises between the vicinity of the first pole core 4 and the vicinity of the second pole core 8 of the rotor 1 during operation. An air flow is created that flows into the rotor 1 from between the second claw-shaped magnetic pole portions 11, and flows out of the rotor 1 between the first claw-shaped magnetic pole portions 7 due to this pressure difference.

Because the field coil 12 is formed so as to have a peaked shape that has two peaks with a valley at an axially central portion, surface area that is exposed to the air that flows through the rotor 1 is ensured to be equal to that of a field coil that has a peaked shape that has a single peak. In addition, because the field coil 12 is formed so as to have a peaked shape that has two peaks, ventilation resistance in the pathway of the air that flows through the rotor 1 is reduced compared to the case of a peaked shape that has a single peak, increasing the flow rate of the air. Heat generated in the field coil 12 is radiated effectively, suppressing temperature increases in the field coil 12. In this manner, because increases in electric resistance values in the field coil 12, which is a factor in reductions in magnetomotive force of the rotor 1, are suppressed, and magnetomotive forces of the rotor 1 are ensured, suppressing declines in output.

Because the field coil 12 is formed so as to have a peaked shape that has two peaks with a valley at an axially central portion, the average value of the outside diameter of the field coil 12 is reduced. Because centrifugal forces that act on the field coil 12 are thereby reduced during rotation of the rotor 1, a holding construction for the field coil 12 can be simplified. Because the field coil 12 also has a valley, the amount of conductor wire is reduced, enabling reductions in cost to be achieved.

Inclined surfaces of the two peaks of the field coil 12 contact the vicinity of the roots of the inner circumferential surfaces of the first claw-shaped magnetic pole portions 7 and the second claw-shaped magnetic pole portions 11, respectively, so as to have the tongue portions 13c of the bobbin 13 interposed. Thus, amplitude of oscillation of the first claw-shaped magnetic pole portions 7 and the second claw-shaped magnetic pole portions 11 is reduced, reducing resonant noise of the first claw-shaped magnetic pole portions 7 and the second claw-shaped magnetic pole portions 11, and also reducing magnetic noise.

Embodiment 2

Figure 3:
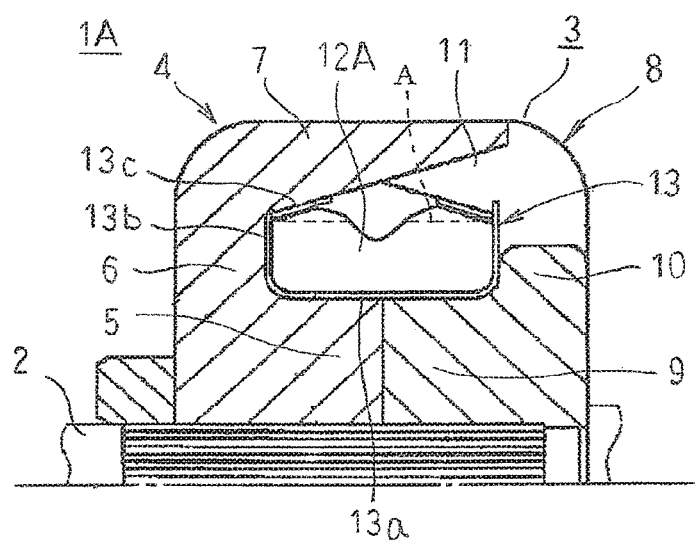
FIG. 3 is a cross section that shows part of a rotary electric machine rotor according to Embodiment 2 of the present invention.

FIG. 3 is a cross section that shows part of a rotary electric machine rotor according to Embodiment 2 of the present invention.

In FIG. 3, a field coil 12A is formed so as to have a peaked shape in which two peaks line up consecutively in an axial direction and that has a valley at an axially central portion. Outside diameters at two ends are equal to an outside diameter A of the root positions of the first claw-shaped magnetic pole portions 7 and the second claw-shaped magnetic pole portions 11. An outside diameter of a floor portion of the valley is less than the outside diameter A of the root positions of the first claw-shaped magnetic pole portions 7 and the second claw-shaped magnetic pole portions 11. Outside diameters at apexes of the two peaks are greater than the outside diameter A of the root positions of the first claw-shaped magnetic pole portions 7 and the second claw-shaped magnetic pole portions 11.

Moreover, a remainder of the configuration is configured in a similar or identical manner to that of Embodiment 1 above.

In a rotor 1A that is configured in this manner, the field coil 12A is formed so as to have a peaked shape that has two peaks with a valley at an axially central portion. In addition, inclined surfaces of the two peaks of the field coil 12A contact the vicinity of the roots of the inner circumferential surfaces of the first claw-shaped magnetic pole portions 7 and the second claw-shaped magnetic pole portions 11, respectively, so as to have the tongue portions 13c of the bobbin 13 interposed. Consequently, similar or identical effects to those in Embodiment 1 above can also be achieved in Embodiment 2.

In Embodiment 2, the outside diameter of the floor portion of the valley of the field coil 12A is less than the outside diameter A of the root positions of the first claw-shaped magnetic pole portions 7 and the second claw-shaped magnetic pole portions 11. Thus, because the surface area of the field coil 12A is increased and ventilation resistance in the air pathways of the air is reduced compared to the field coil 12, temperature increases in the field coil 12A can be further suppressed. Because an average value of the outside diameters of the field coil 12A is reduced compared to the field coil 12, centrifugal forces that act on the field coil 12A can be further reduced. In addition, the amount of conductor wire can be further reduced compared to the field coil 12, enabling reductions in cost to be achieved.

Embodiment 3

Figure 4:
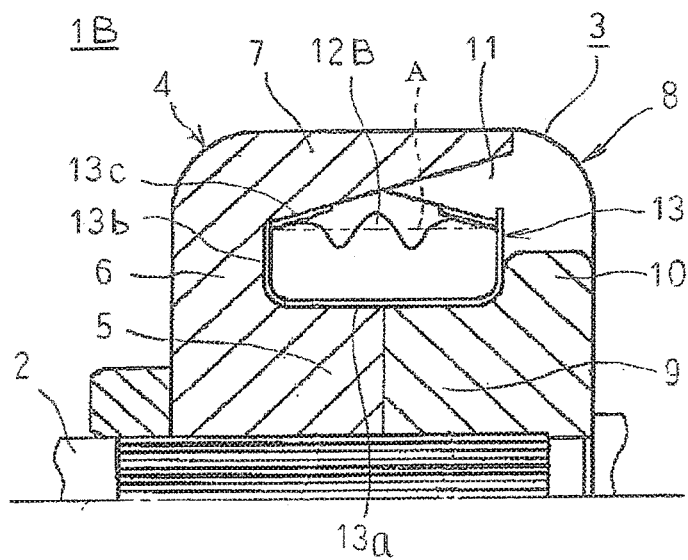
FIG. 4 is a cross section that shows part of a rotary electric machine rotor according to Embodiment 3 of the present invention.

FIG. 4 is a cross section that shows part of a rotary electric machine rotor according to Embodiment 3 of the present invention.

In FIG. 4, a field coil 12B is formed so as to have a peaked shape in which three peaks line up consecutively in an axial direction and that has peaks in a vicinity of two axial end portions and at a central portion. Outside diameters at two ends are equal to an outside diameter A of the root positions of the first claw-shaped magnetic pole portions 7 and the second claw-shaped magnetic pole portions 11. Outside diameters of floor portions of the valleys are less than the outside diameter A of the root positions of the first claw-shaped magnetic pole portions 7 and the second claw-shaped magnetic pole portions 11. Outside diameters at apexes of the three peaks are greater than the outside diameter A of the root positions of the first claw-shaped magnetic pole portions 7 and the second claw-shaped magnetic pole portions 11.

Moreover, a remainder of the configuration is configured in a similar or identical manner to that of Embodiment 1 above.

In a rotor 1B that is configured in this manner, the field coil 12B is formed so as to have a peaked shape that has three peaks with peaks in a vicinity of two axial ends and at an axially central portion. In addition, inclined surfaces of the two peaks in the vicinity of the two axial ends of the field coil 12B contact the vicinity of the roots of the inner circumferential surfaces of the first claw-shaped magnetic pole portions 7 and the second claw-shaped magnetic pole portions 11, respectively, so as to have the tongue portions 13c of the bobbin 13 interposed. Consequently, similar or identical effects to those in Embodiment 1 above can also be achieved in Embodiment 3.

In Embodiment 3, the field coil 12B is formed so as to have a peaked shape that has three peaks, and the outside diameter of the floor portions of the valleys thereof is less than the outside diameter A of the root positions of the first claw-shaped magnetic pole portions 7 and the second claw-shaped magnetic pole portions 11. Thus, because the surface area of the field coil 12B is increased and ventilation resistance in the air pathways of the air is reduced compared to the field coil 12, temperature increases in the field coil 12B can be further suppressed. Because an average value of the outside diameters of the field coil 12B is reduced compared to the field coil 12, centrifugal forces that act on the field coil 12B can be further reduced. In addition, the amount of conductor wire can be further reduced compared to the field coil 12, enabling reductions in cost to be achieved.

Moreover, in Embodiments 1 through 3 above, surface areas of blades of centrifugal fans that are fixed to two axial end surfaces of a Lundell core are changed to make blowing capacities of the two centrifugal fans different, but the number of blades may be changed to make blowing capacities of two centrifugal fans different.

Embodiment 4

Figure 5:
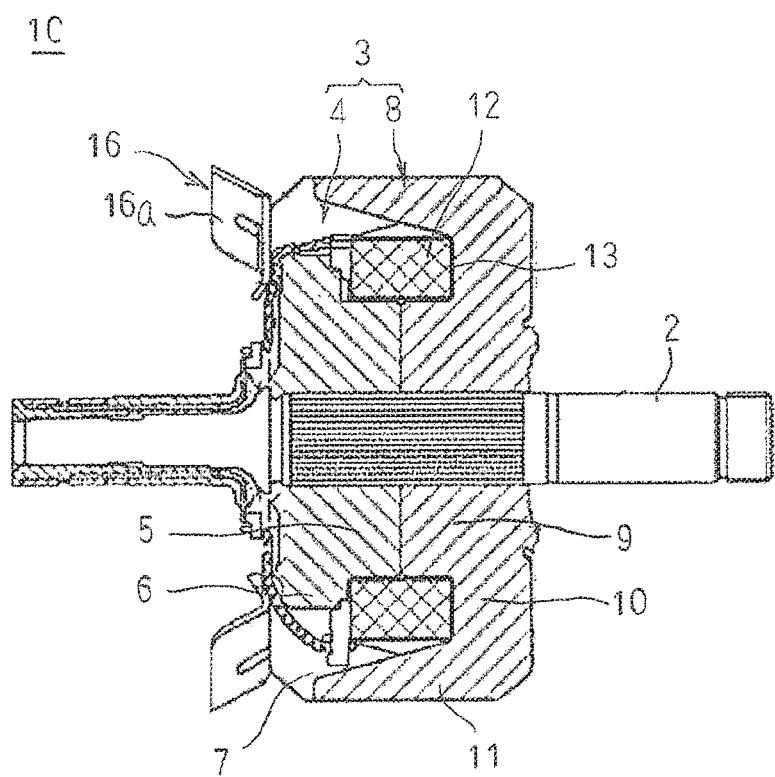
FIG. 5 is a cross section that shows a rotary electric machine rotor according to Embodiment 4 of the present invention.

FIG. 5 is a cross section that shows a rotary electric machine rotor according to Embodiment 4 of the present invention.

In FIG. 5, a mixed flow fan 16 that functions as a cooling fan has blades 16a that are inclined forward in a direction of rotation relative to an axial direction, and is fixed to a first axial end surface of a first pole core 4 by welding, etc.

Moreover, a remainder of the configuration is configured in a similar or identical manner to that of Embodiment 1 above.

In this rotor 1C, the mixed flow fan 16 has intermediate performance between an axial flow fan and a centrifugal fan, and rotates together with the rotation of the Lundell core 3, enabling an air pathway that passes through the Lundell core 3 to be formed.

Consequently, similar or identical effects to those in Embodiment 1 above can also be achieved in Embodiment 4.

According to Embodiment 4, the mixed flow fan 16 need only be fixed to the first axial end surface of the Lundell core 3, enabling the number of parts to be reduced.

Moreover, in Embodiment 4 above, a mixed flow fan is mounted to a first axial end surface of a Lundell core 3, but mixed flow fans may be mounted to two axial end surfaces of a Lundell core 3. In that case, blowing performances of the two mixed flow fans that are mounted to the two axial end surfaces of the Lundell core 3 should be made different.

In Embodiment 4 above, a mixed flow fan is mounted to a first axial end surface of a Lundell core 3, but a centrifugal fan may additionally be mounted to a second axial end surface of the Lundell core 3.

In each of the above embodiments, a Lundell core is configured so as to be divided into two parts, i.e., a first pole core and a second pole core, but the Lundell core is not limited to this configuration, and may be configured so as to be divided into three parts, such as an integrated member that includes a first cylindrical portion and a second cylindrical portion, an integrated member that includes a first yoke portion and first claw-shaped magnetic pole portions, and an integrated member that includes a second yoke portion and second claw-shaped magnetic pole portions, for example.

EXPLANATION OF NUMBERING

1 ROTOR; 2 ROTATING SHAFT; 3 LUNDELL CORE; 5 FIRST CYLINDRICAL PORTION; 6 FIRST YOKE PORTION; 7 FIRST CLAW-SHAPED MAGNETIC POLE PORTION; 9 SECOND CYLINDRICAL PORTION; 10 SECOND YOKE PORTION; 11 SECOND CLAW-SHAPED MAGNETIC POLE PORTION; 12 FIELD COIL; 13 BOBBIN; 13a DRUM PORTION; 13b FLANGE PORTION; 14, 15 CENTRIFUGAL FAN (COOLING FAN); 14a, 15a BLADE.

The invention claimed is:

1. A rotary electric machine rotor comprising:
a Lundell core that comprises:
   a cylindrical portion;
   a pair of ring-shaped yoke portions that are disposed on two axial end portions of said cylindrical portion; and
   a plurality of claw-shaped magnetic pole portions that are disposed so as to extend axially alternately from each of said pair of yoke portions, said claw-shaped magnetic pole portions being arranged circumferentially so as to intermesh with each other;
a rotating shaft that is inserted into and fixed to a central axial position of said Lundell core;

a bobbin that comprises:
- an annular drum portion that is mounted around an outer circumference of said cylindrical portion; and
- a pair of flat ring-shaped flange portions that protrude radially outward from two axial end portions of said drum portion;

a field coil that is wound in multiple layers in a space that is surrounded by said drum portion and said pair of flange portions, said field coil contacting a vicinity of roots of inner circumferential surfaces of said claw-shaped magnetic pole portions; and a cooling fan that supplies air to an outer circumferential surface of said field coil, wherein said field coil is formed so as to have a peaked shape in which only two or three peaks line up consecutively in an axial direction, an apex portion of each of said peaks being positioned radially further outward than a root position of said claw-shaped magnetic pole portions.

2. The rotary electric machine rotor according to claim 1, wherein said cooling fan is constituted by a pair of centrifugal fans that are fixed to two axial end portions of said Lundell core, said pair of centrifugal fans being configured so as to have mutually different blowing capacities.

3. The rotary electric machine rotor according to claim 1, wherein said cooling fan is a mixed flow fan that is fixed to one axial end portion of said Lundell core.

* * * * *